June 30, 1931.  O. F. CARLSON  1,812,035
SULKY HAY RAKE
Original Filed March 26, 1927   3 Sheets-Sheet 1
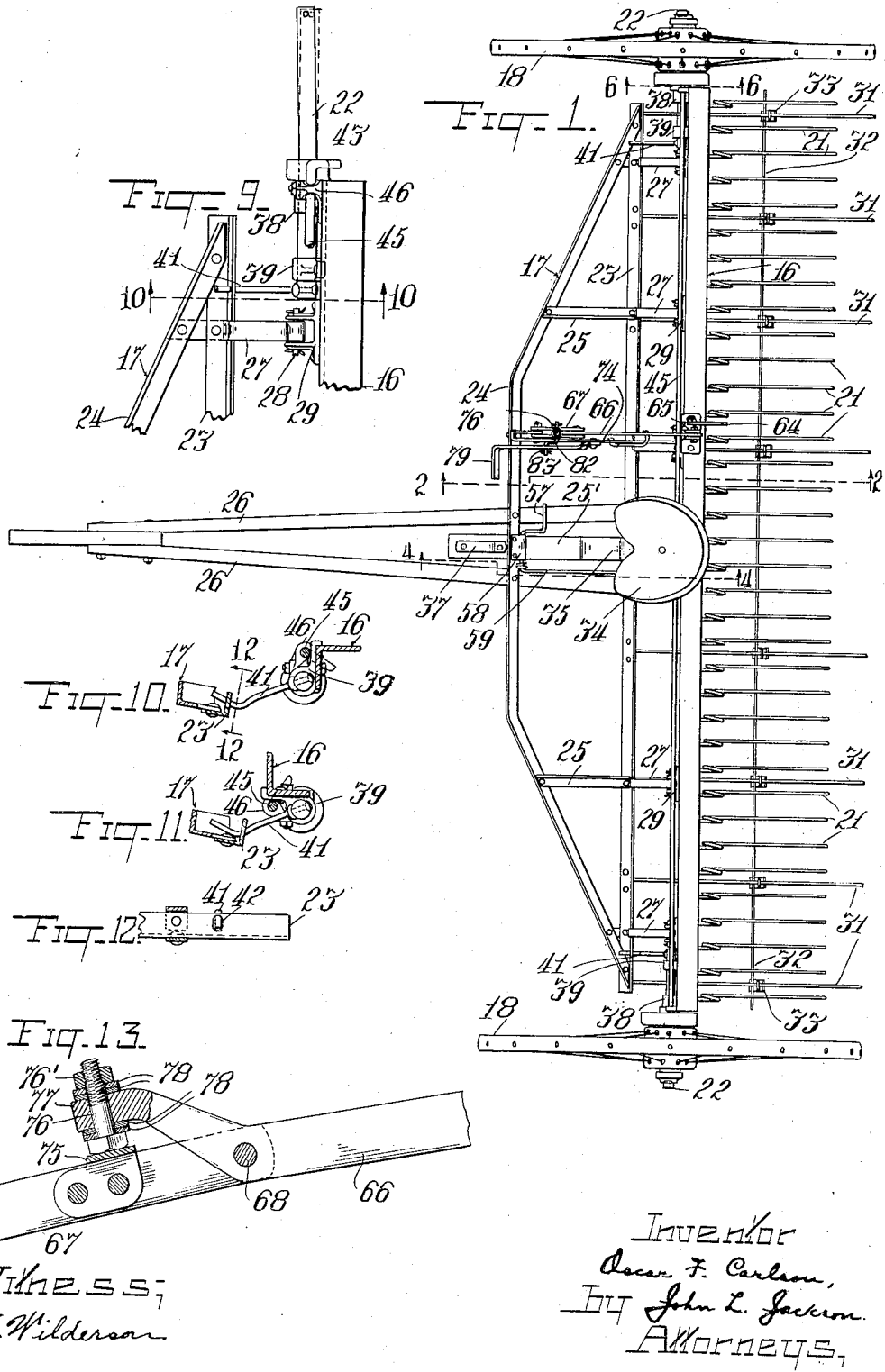
Witness;
E. Wilderson
Inventor
Oscar F. Carlson,
By John L. Jackson.
Attorneys,

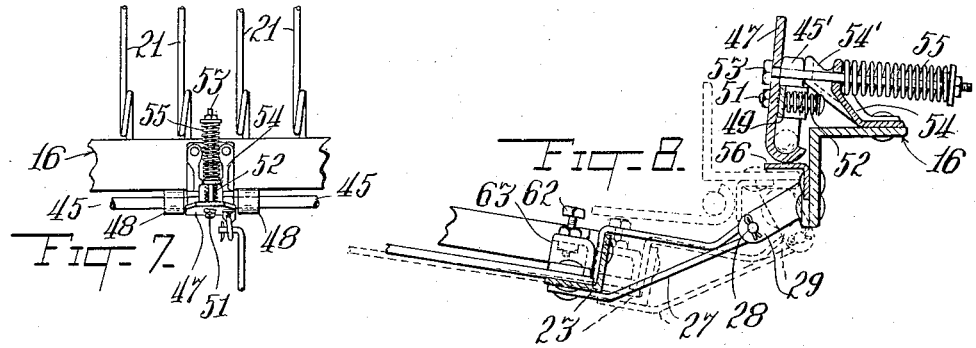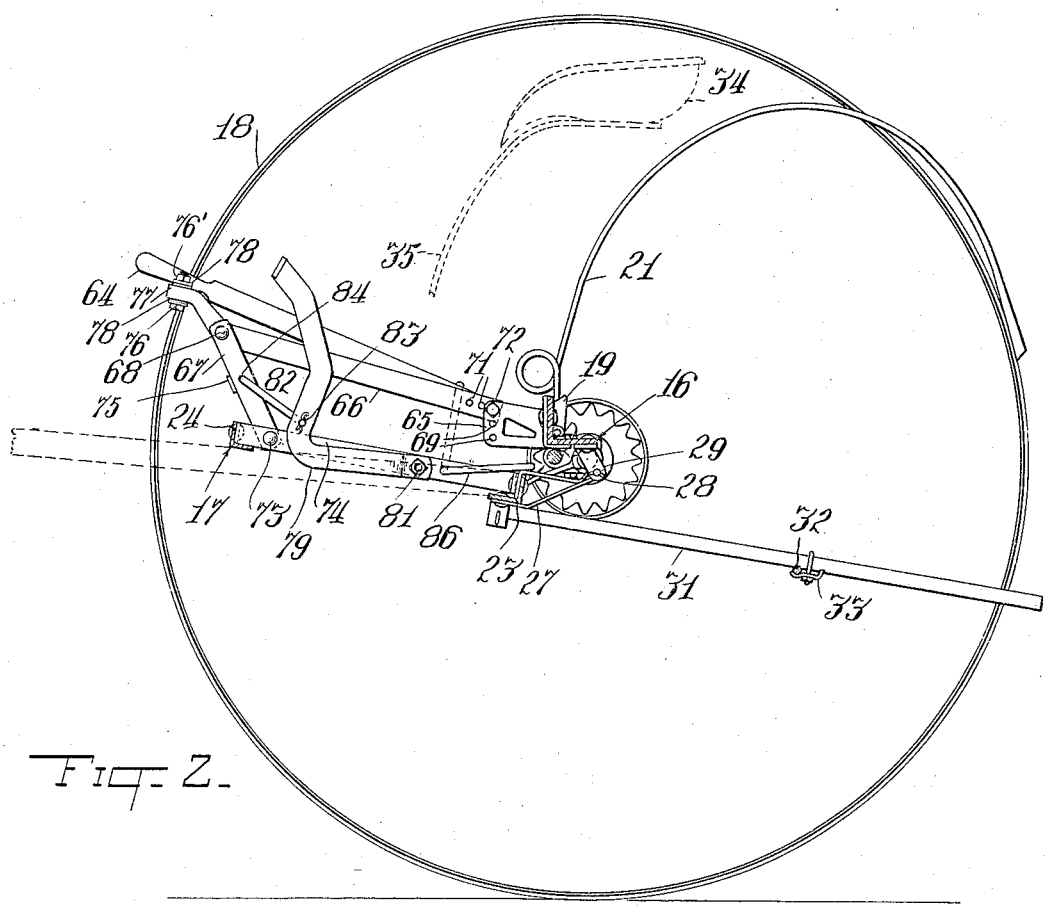

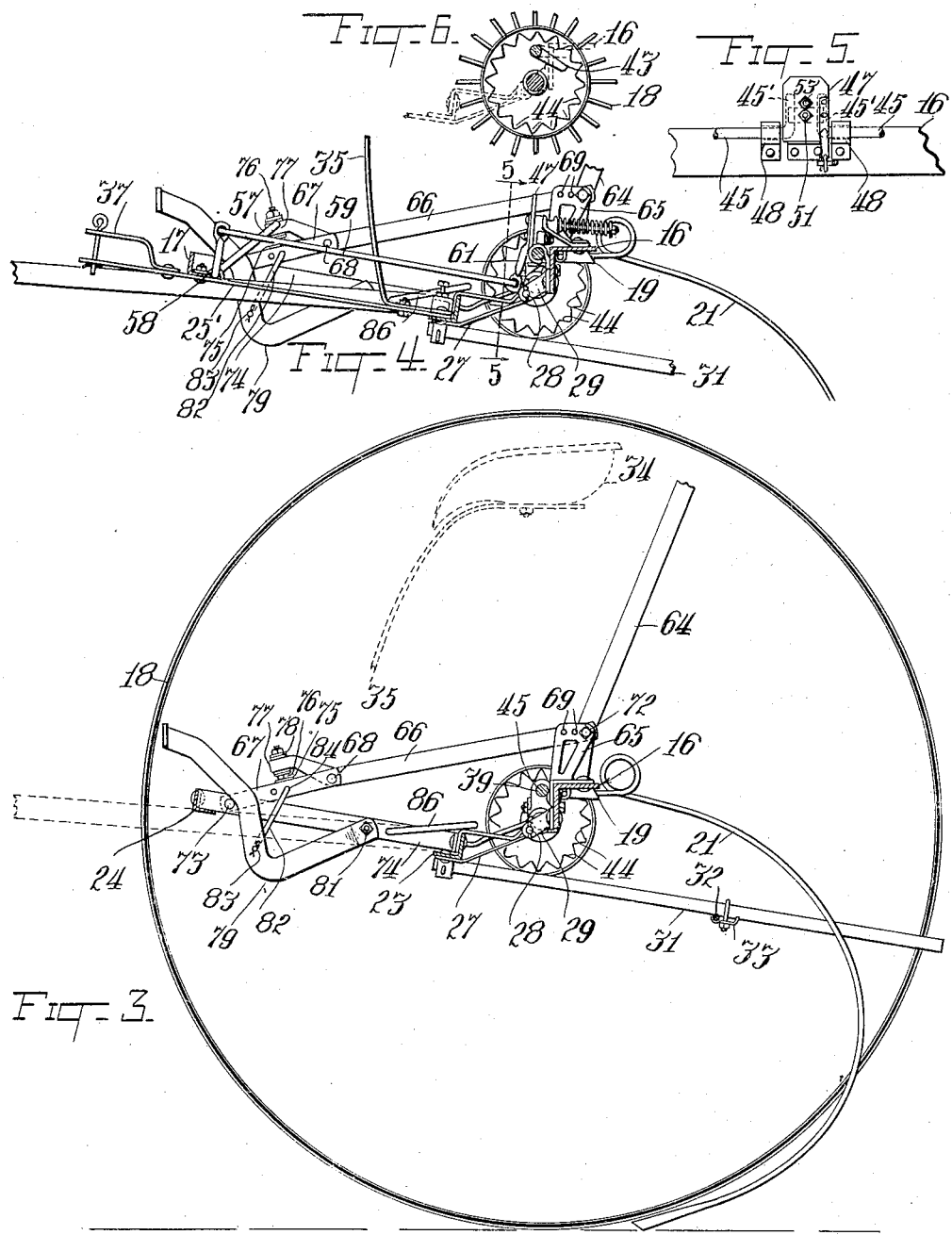

Patented June 30, 1931

1,812,035

UNITED STATES PATENT OFFICE

OSCAR F. CARLSON, OF MOLINE, ILLINOIS, ASSIGNOR TO DEERE & COMPANY, OF MOLINE, ILLINOIS, A CORPORATION OF ILLINOIS

SULKY HAY RAKE

Application filed March 26, 1927, Serial No. 178,535. Renewed December 9, 1929.

The present invention relates to sulky hay rakes, and has particular reference to rakes of the self dumping type, wherein traction power derived from the vehicle is utilized to swing the hay gathering teeth from a gathering position upwardly to a dumping position for dumping the hay.

The objects of the invention are: to provide an improved mechanism for determining the lowermost gathering position of the rake teeth; to provide improved foot pedal mechanism for quickly returning the teeth to their gathering position and for holding them in such position; and to improve upon the general construction of these implements.

Referring to the accompanying drawings wherein I have illustrated a preferred embodiment of my invention:

Figure 1 is a plan view of the present rake.

Fig. 2 is a transverse sectional view through the rake, taken on the plane of the line 2—2 of Figure 1, and illustrating the rake teeth in their dumping position.

Fig. 3 is a similar view illustrating the rake teeth in their gathering position.

Fig. 4 is a transverse sectional view taken on the plane of the line 4—4 of Figure 1.

Fig. 5 is a front elevational view of the tripping plate and the adjacent ends of the dump rods, corresponding to a section on the plane 5—5 of Fig. 4.

Fig. 6 is an elevational view of one of the wheel hubs, corresponding to a section on the plane of the line 6—6 of Figure 1.

Fig. 7 is a plan view of the trip plate mechanism shown in Fig. 5.

Fig. 8 is a transverse sectional view through this tripping plate and adjoining parts.

Fig. 9 is a fragmentary plan view showing the connection of each axle with the rake head and with the front frame.

Fig. 10 is a detail sectional view taken on the plane of the line 10—10 of Fig. 9.

Fig. 11 is a similar view showing the relation of the parts when the rake head has been revolved upwardly to its dumping position.

Fig. 12 is a detail view taken on the plane of the line 12—12 of Fig. 10, and

Fig. 13 is a detail sectional view showing the adjustable stop screws for the pedal link mechanism.

Referring to Figure 1, the device comprises a rake head 16, a front frame 17 and the two side wheels 18. The rake head consists of a long section of angle bar to which is secured a plurality of tooth holders 19 supporting the spring teeth 21 (see Figs. 2 and 3). The ends of the rake head 16 support the axles 22 on which the wheels 18 are journaled, the arrangement being such that the rake head and the entire row of gathering teeth 21 swing upwardly around the centers of the axles 22 in moving to a dumping position, as will hereinafter appear.

The front frame 17 comprises a rear angle bar 23 and a bowed front angle bar 24, between which extend brace bars 25. Two shafts 26 are bolted to this frame and extend forwardly therefrom, being adapted for different attachment to the frame depending upon whether one horse or two horses are used for draft. The rear bar of the draft frame 17 has secured thereto at spaced points along its length hinge brackets 27 which have pivotal connection on pins 28 carried between the arms of hinge brackets 29 secured to the rake head 16. This pivotal connection between the front frame 17 and the rake head 16 permits the pivotal movement of the rake head relative to the front frame, incident to the dumping operation of the rake. This construction is best shown in Figure 8.

Cleaner teeth 31 are secured to the rear bar 23 of the front frame and extend back between the gathering teeth 21 for stripping the hay therefrom in each dumping operation. These cleaner teeth are suitably clamped to a transversely extending tie rod 32 by clamps 33. The operator's seat 34 is carried on a seat spring 35 riveted at its lower end to a center frame brace 25'. This latter brace extends forwardly beyond the front bar 24 of the frame and carries an angle clip 37 (Fig. 4), forming a clevis for receiving the single tree or double tree of the draft hitch.

Referring to Fig. 9, each end of the rake head 16 supports a pair of spaced brackets 38 and 39 in which is mounted the axle 22. Each axle is desirably given a slight camber, illustrated in exaggeration by the dotted lines, to gather the wheels in a forward and downward direction. As above described, the rake head 16 is pivotally connected with the front frame 17 at spaced points along its length by means of pins 28 which are supported in brackets 29 that extend forwardly from the rake head, and the rear ends of the hinge brackets 27 of the front frame 17 embrace the pins 28. This construction is best shown in Figure 8. It should be particularly noted at this point, however, that the axis of the pins 28 is not coincident with the horizontal portions of the axles 22 that are journaled in the brackets 38 and 39, but such axis lies in a plane in advance of and below the axis of the portions of the axles that are mounted in the wheel hubs, as best shown in Figs. 4, 6 and 8. In consequence of this relation of axes between the rake head and axles, and the rake head and front frame, the front frame is lowered slightly as the rake head is elevated into dumping position (see Fig. 8). The object in so relating the rake head and front frame is to utilize not only the weight of the front frame but also the weight of the driver, which is supported upon the front frame, to retard the action of the rake head at the time of dumping so that it will not drop back to raking position too quickly so as to engage the hay that has been dumped by the rake. In other words, the weight of the driver aids somewhat in rocking the rake head into dumping position. Consequently, the weight of the rake head returning to raking position must raise the front frame slightly, which raising of the frame is resisted by the weight of the frame and the weight of the driver, thereby slowing down te rocking movement of the rake head, so that the machine will have advanced far enough by the time the rake head has returned to normal position for the teeth to clear the hay that has just been dumped by the rake.

This slight rising and falling movement of the front frame makes desirable the provision of some means for holding the axles 22 against rotation during the dumping operation, and also to accommodate the fore and aft movement of the front frame relative to the axles that occurs at this time, and to this end, as best shown in Figs. 10, 11 and 12, I have provided a rod 41 fastened to the inner end of the axle and projecting downwardly and forwardly with a slight bend to extend through a hole 42 in the vertical flange of the frame angle bar 23. This bend in the rod 41 is such that as the opening 42 in the front frame member 43 plays along the rod during the dumping of the rake the positions of the axles 22 are maintained substantially constant. By this arrangement, the rake head 16 is allowed to swivel on the axles 22 in the dumping operation, with the axles held against rotation by these rods 41. Fig. 11 illustrates how the rods 41 are free to slide forwardly through the holes 42 in the slight converging movement of the frame and rake head incident to a dumping operation.

The dumping operation is effected in the well known manner of having dogs or pawls carried by the rake head engage in internally toothed hubs on the wheels, whereby the traction power of the wheels is utilized to swing the rake teeth upward to their dumping position. One of these dogs or pawls is illustrated at 43 in Fig. 6, it being noted that this dog is adapted for swinging movement into and out of engagement with the internal teeth 44 formed in the hub of the adjacent wheel 18. Each dog at the end of the rake head is formed on the end of a dump rod 45 which has bearing support at its outer end in a boss 46, Figs. 9 and 10 formed integral with the outer axle supporting bracket 38. The rods extend along the front side of the rake head 16 approximately to the center thereof where they have connection with a rocking trip plate 47. The rods have bearing support at each side of the trip plate in bearing clips 48 secured to the rake head. As shown in Figs. 5 and 8, the inner ends of the rods are bent upwardly as indicated at 45′, these bent ends lying in the curved bottom flange of the trip plate and extending up along the back side thereof. An equalizing clamp 49 having U-shaped ends partially engaging around the back sides of the bent rod ends 45′ is mounted on the back of the tripping plate 47. A bolt 51 passing through the central portion of this equalizing clamp carries a spring 52 which presses the clamp towards the tripping plate and thus resiliently holds the rod ends against the back of the plate. An upper bolt 53 also extending through this tripping plate passes through a bracket 54 riveted to the rake head 16 and carries an adjustable spring 55 which resiliently tends to swing the tripping plate backwardly to hold the bent rod ends 45′ against stops 54′ on the bracket 54. This angular position of the dump rods, as normally maintained by the spring 55, corresponds to a disengaged position of the clutching dogs 43, as shown by their full line position in Fig. 6. An angle bracket 56, riveted to the rake head 16 below the trip plate, serves as a supporting and reinforcing member for such plate.

The tripping plate and dump rods are rocked to swing the dogs 43 into engaging positions (corresponding to the dotted line position shown in Fig. 6) through a foot trip lever 57. This lever is supported in a bearing 58 secured to the front portion of the frame 17, with the pedal portion of the lever extending upwardly from one side of the bearing, and the operating arm portion thereof extending upwardly from the other side of the bearing. A link 59 pivotally connects to the operating arm portion and extends rearwardly to make pivotal connection with an arm 61 extending down from the lower edge of trip plate 47, this latter pivotal connection being disposed below the axis of the rods 45. Depressing the trip pedal 57 operates to push the link 59 rearwardly, and thus to rock both dump rods counterclockwise (as viewed in Fig. 8) through the intervention of the trip plate, thereby swinging the two dogs 43 outwardly into the internal teeth 44 and clutching the rake head to the wheels. Thereupon the rake head is revolved with the wheels to swing the gathering teeth 21 upwardly to the dumping position, shown in Fig. 2. The rotative movement of the rake head is limited by the tripping plate 47 striking a snubbing bolt 62 mounted in a bracket 63 on the front frame 17. The engagement of the tripping plate with this bolt causes the tripping plate to be rocked backwardly with the result that the dump rods are revolved clockwise out of the internal teeth 44 to release the clutching engagement between the rake head and wheels. The rake teeth 21 now drop back to their gathering position shown in Fig. 3. By adjusting the snubbing bolt 62 upwardly or downwardly in its bracket 63 the point of tripping release can be adjusted for obtaining any desired range of dumping movement of the gathering teeth.

Rigidly connected to the rake head for swinging movement therewith is a hand lever 64 through which the gathering teeth can be operated. This hand lever is fastened to one side of a base member or bracket 65 which is fixedly secured to the rake head.

Connecting between the rake head 16 and the front frame 17 is a system of linkage which determines the lowermost point to which the teeth 21 can move in their gathering position, and which also aids in quickly returning the teeth to such position after a dumping operation. This linkage comprises a pair of toggle or knuckle-joint links 66 and 67 which have their inner adjoining ends pivoted together on a pivot bolt 68. The rear link 66 is preferably pivoted to the bracket 65 on which the hand lever 64 is mounted. This bracket is provided with a plurality of pivot holes 69 spaced along its upper edge, and the link 66 is also provided with a plurality of cooperating pivot holes 71 (Fig. 2). The link can be shifted to bring any pair of holes into alinement for receiving the pivot bolt 72, thereby providing a ready adjustment for varying the effective length of the linkage.

The front link 67, which, as shown in Figure 1, preferably consists of two parallel link bars, is pivoted at its front end on a pivot bolt 73 carried by a supporting bar 74, which supporting bar extends between and is riveted to the front and rear angle bars 24 and 23 of the front frame. The forward end of the supporting bar 74 may be folded back to provide two spaced points of support for the pivot bolt 73, with the link bars 67 engaging over opposite sides of this rearwardly folded portion (Fig. 1).

The two links 66 and 67 function in the manner of a toggle or folding strut for limiting the backward and downward swinging movement of the rake head and thereby controlling the position of the ends of the rake teeth 21 relative to the ground. When the rake head revolves up to its dumping position, the links fold upwardly and forwardly, as illustrated in Fig. 2, and when the rake head swings back to gathering position the links open or straighten out to limit the movement of the rake head in this direction. The provision of the holes 69 in the bracket 65, together with the holes 71 in the link 66 affords one adjustment for determining the lowermost point to which the rake teeth can swing when in their gathering position. Two cooperating limiting stops associated with the knuckle pivot 68 also afford a relatively fine adjustment, serving to adjust this same position of the rake teeth and to take up wear between the operating parts. One of these stops consists of an inverted U-shaped bracket 75 (Fig. 13) which is riveted between the link bars 67 adjacent to the knuckle joint. The other stop consists of a bolt 76 which passes through an apertured arm 77 extending forwardly from the end of the rear link 66 over the stop 75. Washers 78 are placed under the head of this bolt and under its nut 76', and by shifting these washers from one side of the apertured arm to the other, the point at which the two stops will engage can be adjusted to properly limit the movement of the links when straightening out in the return movement of the rake head to gathering position. Preferably, these stops are arranged to engage before the knuckle joint 68 moves into line with the end pivots 72 and 73, thereby preventing the toggle links from locking.

The foot pedal which cooperates with this linkage system for quickly returning the teeth to gathering position and for holding them in such position is indicated at 79. The rear end of this pedal is pivoted to the supporting bar 74 at 81. The rear portion of the pedal lever is formed with a downwardly bent section and the front pedal portion is curved upwardly and forwardly to clear the front frame bar 24. A link 82 is pivotally connected at 83 to the lower portion of the foot pedal, and at its other end this link is pivoted at 84 to the front toggle link 67. The pivot portion 84 of the link 82 may be extended through the two link bars 67 to aid in supporting the bracket stop 75 between such link bars.

When the main toggle links 66 and 67 swing forwardly in a dumping operation of the rake head (Fig. 2), the link 82 is drawn forwardly, thus causing the foot pedal 79 to be swung upwardly approximately to the position illustrated in this figure. It will be observed that at such time the foot pedal 79 and link 82 extend in the relation of a pair of toggle links connected to the main toggle links 66 and 67. Downward pressure now exerted on the foot pedal 79 will tend to fold this secondary toggle downwardly, thus pulling rearwardly on the main toggle link 67 through the foot pedal link 82. Hence this downward pressure on the foot pedal will apply a force to the toggle links tending to return these links to their former positions, whereby the operator can hasten the return of the rake teeth to their gathering position. Moreover, the operator can hold the rake teeth down to their work through this foot pedal.

It will be observed that the toggle links 66 and 67 cannot at any point in their folding movement lock the foot pedal in a position where pressure exerted thereon would be ineffective for returning the rake teeth to their gathering position. Attention is also directed to the fact that the foot pedal has a comparatively small rearward swing so that there is no possibility of the pedal striking or forcing the operator's leg backwardly as the rake teeth move up to dumping position. This avoids one of the objections to prior forms of foot lever linkage heretofore embodied in these sulky rakes. As shown in Figure 1, the trip pedal 57 and the rake head return pedal 79 are preferably both disposed at the right hand side of the operator's seat 34, so that the operator can only actuate one of these pedals at a time.

Referring to Fig. 2, a transport link 86 is pivotally connected to the supporting bar 74 adjacent to the rear end of the latter, this link having a hook shaped upper end adapted to hook over the top of the link 66, for holding the rake head in its upper dumping position, as indicated in dotted lines, when the vehicle is being transported to or from the field.

What I claim as my invention and desire to secure by Letters Patent, is—

1. In a sulky hay rake, the combination with a rake head carrying rake teeth, and a frame relative to which said rake head has swinging movement between gathering and dumping positions, of multiple link mechanism connected between said rake head and frame, and a foot pedal pivotally supported on said frame independently of said link mechanism and operative through the latter to return said rake head to gathering position.

2. In a sulky hay rake, the combination with a rake head carrying rake teeth, and a frame relative to which said rake head has swinging movement between gathering and dumping positions, of a pair of links connected between said rake head and said frame and comprising an intermediate joint adapted to fold upwardly in the dumping movement of said rake head, and pedal means pivotally supported on said rake independently of said pair of links, said pedal means being connected to said links and operative to swing said intermediate joint downwardly in the return of said rake head to gathering position.

3. In a sulky hay rake, the combination with a rake head carrying rake teeth, and a frame relative to which said rake head has swinging movement between gathering and dumping positions, of multiple link mechanism connected between said rake head and said frame, and a pair of toggle links connected between said frame and said link mechanism, one of said toggle links comprising a foot pedal for actuating said link mechanism.

4. In a sulky hay rake, the combination with a rake head carrying rake teeth, and a frame relative to which said rake head has swinging movement between gathering and dumping positions, of front and rear links connected together, a pivot connecting said rear link to said rake head, a pivot connecting said front link to said frame, and a foot pedal pivotally mounted on said frame in rear of said second pivot and connected for transmitting operating movement to said links for returning said rake head to gathering position.

5. In a sulky hay rake, the combination with a rake head carrying rake teeth, and a frame relative to which said rake head has swinging movement between gathering and dumping positions, of a pair of toggle links connected between said rake head and said frame, said toggle links comprising a knuckle joint adapted to fold upwardly in the dumping movement of said rake head, a foot pedal pivoted to said frame, and a link connecting said foot pedal with the front toggle link.

6. In a sulky hay rake, the combination with a rake head carrying rake teeth, and a frame relative to which said rake head has swinging movement between gathering and dumping positions, of front and rear links, a pivot connecting said rear link to said rake head, a second pivot connecting said front link to said frame, a knuckle joint connecting said links and adapted to fold upwardly in the dumping movement of said rake head, a foot pedal, a third pivot connecting said foot pedal to said frame in rear of said second pivot, and a link pivotally connected to said foot pedal and to said front link intermediate said second pivot and said knuckle joint.

7. In a sulky hay rake, the combination with a rake head carrying rake teeth, and a frame relative to which said rake head has swinging movement between gathering and dumping positions, of a pair of links connected between said rake head and frame and comprising an intermediate knuckle joint, and adjustable stop means cooperating with said knuckle joint for limiting the pivotal movement between said links in one direction.

8. In a sulky hay rake, the combination with a rake head carrying rake teeth, and a frame relative to which said rake head has swinging movement between gathering and dumping positions, of a pair of links connected between said rake head and frame and comprising a knuckle joint, stop means carried by said links adjacent to said knuckle joint for limiting the pivotal movement of said links in one direction, and a foot pedal pivotally supported on said frame independently of said link mechanism and operative through said link mechanism to return said rake head to gathering position.

9. In a sulky hay rake, the combination with a rake head carrying rake teeth, and a frame relative to which said rake head has swinging movement between gathering and dumping positions, of front and rear links connected together, pivot means connecting said front link to said frame, pivot means connecting said rear link to said rake head, said latter pivot means being adjustable to vary the effective length of said linkage, and a foot pedal pivotally supported on said frame independently of said linkage and operative therethrough to return said rake head to gathering position.

10. In a sulky hay rake, the combination with a rake head carrying rake teeth, and a frame relative to which said rake head has swinging movement between gathering and dumping positions, of a pair of cooperating folding links pivotally connected between said rake head and frame and adapted to have pivotal movement with the movement of said rake head to its different positions, and means movable into and out of engagement with one of said links for locking said rake head in its dumping position.

11. In a sulky hay rake, the combination with a rake head carrying rake teeth, and a frame relative to which said rake head has swinging movement between gathering and dumping positions, of a pair of cooperating folding links pivotally connected between said rake head and frame and adapted to have pivotal movement with the movement of said rake head to its different positions, and a transport hook pivoted to said frame and adapted to engage over one of said links for holding said rake head in its dumping position.

12. In a sulky hay rake, the combination with a rake head carrying rake teeth and a frame relative to which said rake head has swinging movement between gathering and dumping positions, axles journaled on the outer ends of said rake head, supporting wheels journaled on said axles, and pivot means connecting said rake head with said frame and so related to the frame and the axis of the supporting wheels that when said rake head is elevated to dumping position said frame will be lowered.

13. In a sulky hay rake, the combination with a rake head carrying rake teeth and a frame relative to which said rake head has swinging movement between gathering and dumping positions, axles supported by the outer ends of said rake head, supporting wheels journaled on said axles, and means for holding said axles against rotation relative to the frame during the swinging movement of the rake head, and pivot means connecting said rake head with said frame, said pivot means being so positioned with respect to the axis of the supporting wheels and the frame that when the rake head is elevated to dumping position the frame will be lowered.

14. In a sulky hay rake, the combination with a rake head carrying rake teeth and a frame relative to which said rake head has swinging movement between gathering and dumping positions, axles supported by the outer ends of said rake head, supporting wheels journaled on said axles, a lifting shaft for said rake head, and pivot means connecting said rake head with said frame, said pivot means being so positioned with respect to the axis of the supporting wheels and said frame that when the rake head is elevated to dumping position the frame will be lowered and when the rake head is swung back to gathering position said frame will be raised, thereby utilizing the weight of the frame and of the driver mounted thereon to retard the movement of the rake head back to gathering position.

15. In a sulky hay rake, the combination with a rake head carrying rake teeth and a frame relative to which said rake head has swinging movement between gathering and dumping positions, axles supported by the outer ends of said rake head, supporting wheels journaled on said axles, means for holding said axles against rotation relative to the frame during the swinging movement of the rake head, a bracket extending forwardly from said rake head, and pivot means connecting said bracket with said frame, said pivot means lying in a plane in advance of and below said axle.

16. In a sulky hay rake, the combination with a rake head carrying rake teeth and a frame relative to which said rake head has swinging movement between gathering and dumping positions, axles supported by the outer ends of said rake head, supporting wheels journaled on said axles, means for holding said axles against rotation relative to the frame during the swinging movement of the rake head, a bracket extending forwardly from said rake head, a bracket extending rearwardly from said frame, and pivot means connecting said brackets, said pivot means lying in a plane in advance of and below said axles.

17. In a sulky hay rake, the combination with a rake head carrying rake teeth and a frame relative to which said rake head has swinging movement between gathering and dumping positions, axles journaled on the outer ends of said rake head and around which axles said rake head swings from gathering to dumping position, supporting wheels journaled on said axles, and pivot means connecting said rake head with said frame, said pivot means being so positioned with respect to the axes of the supporting wheels and said frame that the frame will be lowered slightly when the rake head is elevated to dumping position and will be raised when the rake head is returned to gathering position, thereby utilizing the weight of the frame in resisting the return of the rake head to gathering position.

18. In a sulky hay rake, the combination with a rake head carrying rake teeth, and a frame member relative to which said rake head has swinging movement between gathering and dumping positions, axle members supported by the outer ends of said rake head and about which axle members said rake head turns in its movements from gathering to dumping position and from dumping to gathering position, supporting wheels journaled on said axle members, pivot means connecting said rake head with said frame member and so positioned relative to said frame member and said axle members that when said rake head is elevated to dumping position said frame member will be lowered, and means connected with each axle member and said frame member and having sliding engagement with one of said members whereby said axle members are held against rotation upon the lowering of said frame member.

19. In a sulky hay rake, the combination with a rake head carrying rake teeth, and a frame relative to which said rake head has swinging movement between gathering and dumping positions, axles supported by the outer ends of said rake head and about which axles said rake head turns in its movements from gathering to dumping position and from dumping to gathering position, supporting wheels journaled on said axles, pivot means connecting said rake head with said frame whereby when said rake head is elevated to dumping position said frame will be lowered, and means connected with said axles and having sliding engagement with said frame for preventing rotation of said axles when said rake head turns on said axles in elevating it to dumping position.

20. In a sulky hay rake, the combination with a rake head carrying rake teeth and a frame relative to which said rake head has swinging movement between gathering and dumping positions, axles journaled on the outer ends of said rake head, supporting wheels journaled on said axles, means for holding said axles against rotation relative to the frame during the swinging movement of the rake head, and pivot means connecting said rake head with said frame, said pivot means being positioned eccentrically with relation to the axis of the supporting wheels.

OSCAR F. CARLSON.